United States Patent
Duff et al.

(10) Patent No.: US 10,021,193 B2
(45) Date of Patent: *Jul. 10, 2018

(54) SESSION TABLE FRAMEWORK

(71) Applicant: salesforce.com, inc., San Francisco, CA (US)

(72) Inventors: John Duff, Rocklin, CA (US); Manu Gurudatha, San Francisco, CA (US); Ashik Uzzaman, Fremont, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/271,110

(22) Filed: Sep. 20, 2016

(65) Prior Publication Data
US 2017/0013067 A1    Jan. 12, 2017

Related U.S. Application Data

(60) Continuation of application No. 14/171,561, filed on Feb. 3, 2014, now Pat. No. 9,456,038, which is a division of application No. 13/208,206, filed on Aug. 11, 2011, now Pat. No. 8,650,202.

(60) Provisional application No. 61/435,667, filed on Jan. 24, 2011.

(51) Int. Cl.
*G06F 17/30* (2006.01)
*H04L 29/08* (2006.01)
*H04L 29/06* (2006.01)

(52) U.S. Cl.
CPC ...... *H04L 67/141* (2013.01); *G06F 17/30292* (2013.01); *G06F 17/30303* (2013.01); *H04L 67/14* (2013.01); *H04L 67/32* (2013.01); *H04L 67/42* (2013.01)

(58) Field of Classification Search
CPC ..................... G06F 17/30303; G06F 17/30561
USPC ............... 707/756, 769, 770, 792, 793, 802; 709/227; 717/168, 169, 170
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

OTHER PUBLICATIONS

E. Cerqueira, Mobility Support for Multi-user Sessions over Heterogeneous Networks, 2007, IEEE, 297-304.*

(Continued)

*Primary Examiner* — Jean B Fleurantin
(74) *Attorney, Agent, or Firm* — Elliott, Ostrander & Preston, P.C.

(57) ABSTRACT

In accordance with embodiments disclosed herein, there are provided methods, systems, and apparatuses for implementing a session table framework including, for example, receiving a request at a host organization from a client device, in which such a request specifies an application available via the host organization; generating a user session unique to the client device in a memory of the host organization; creating a user session data table within the user session; processing the request via the application specified by the request on behalf of the client device; updating the user session data table based on the processing of the request; and transmitting a response to the client device responsive to the request.

20 Claims, 12 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,003,560 B1 | 2/2006 | Mullen et al. |
| 7,027,975 B1 | 4/2006 | Pazandak et al. |
| 7,340,411 B2 | 3/2008 | Cook |
| 7,620,655 B2 | 11/2009 | Larsson et al. |
| 7,840,413 B2 | 11/2010 | Yoshida et al. |
| 9,456,038 B2 * | 9/2016 | Duff et al. .................. 707/807 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0118560 A1 | 5/2007 | Bornhoevd et al. |
| 2008/0275884 A1 | 11/2008 | Yoshida et al. |
| 2008/0281610 A1 | 11/2008 | Yoshida et al. |
| 2009/0024673 A1 | 1/2009 | Barker et al. |
| 2010/0235241 A1 | 9/2010 | Wang et al. |
| 2012/0201361 A1 | 8/2012 | Angel et al. |
| 2014/0143285 A1 * | 5/2014 | Duff et al. .................. 707/807 |
| 2017/0013067 A1 * | 1/2017 | Duff .................. G06F 17/30303 |

OTHER PUBLICATIONS

Office Action for U.S. Appl. No. 13/208,206 dated Feb. 28, 2013, 19 pages.

Office Action for U.S. Appl. No. 13/208,201 dated Apr. 15, 2013, 32 pages.

Notice of Allowance for U.S. Appl. No. 13/208,20, dated Oct. 15, 2013, 12 pages.

Final Office Action for U.S. Appl. No. 13/208,201 dated Nov. 26, 2013, 29 pages.

Lau, et al., "Model Synchronization for Efficient Software Application Maintenance," 2004, IEEE, 1 pages.

Saaksjarvi, "Software Application Platforms: From Product Architecture to Integrated Application Strategy," 2002, IEEE, 435-443.

* cited by examiner

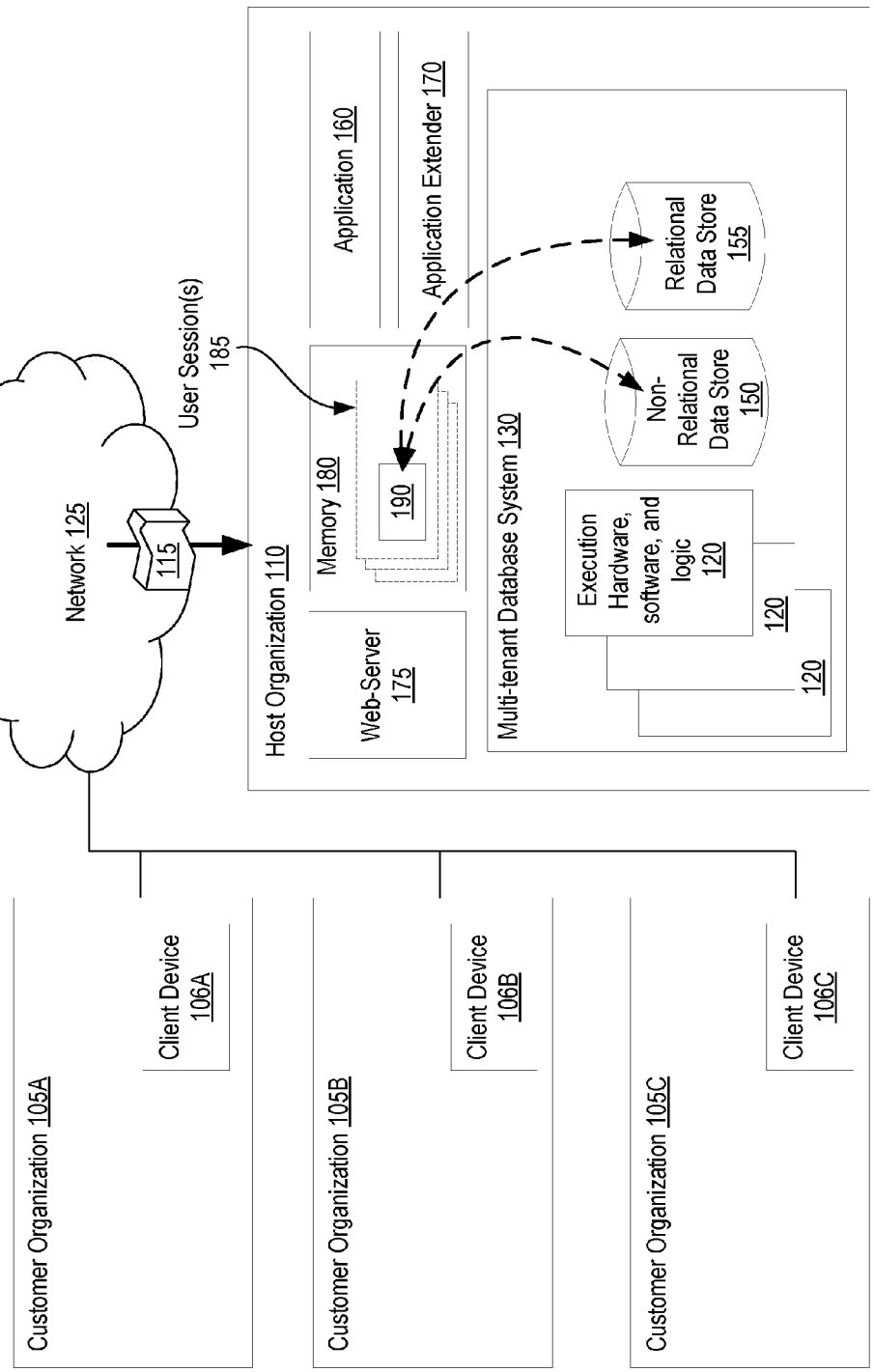

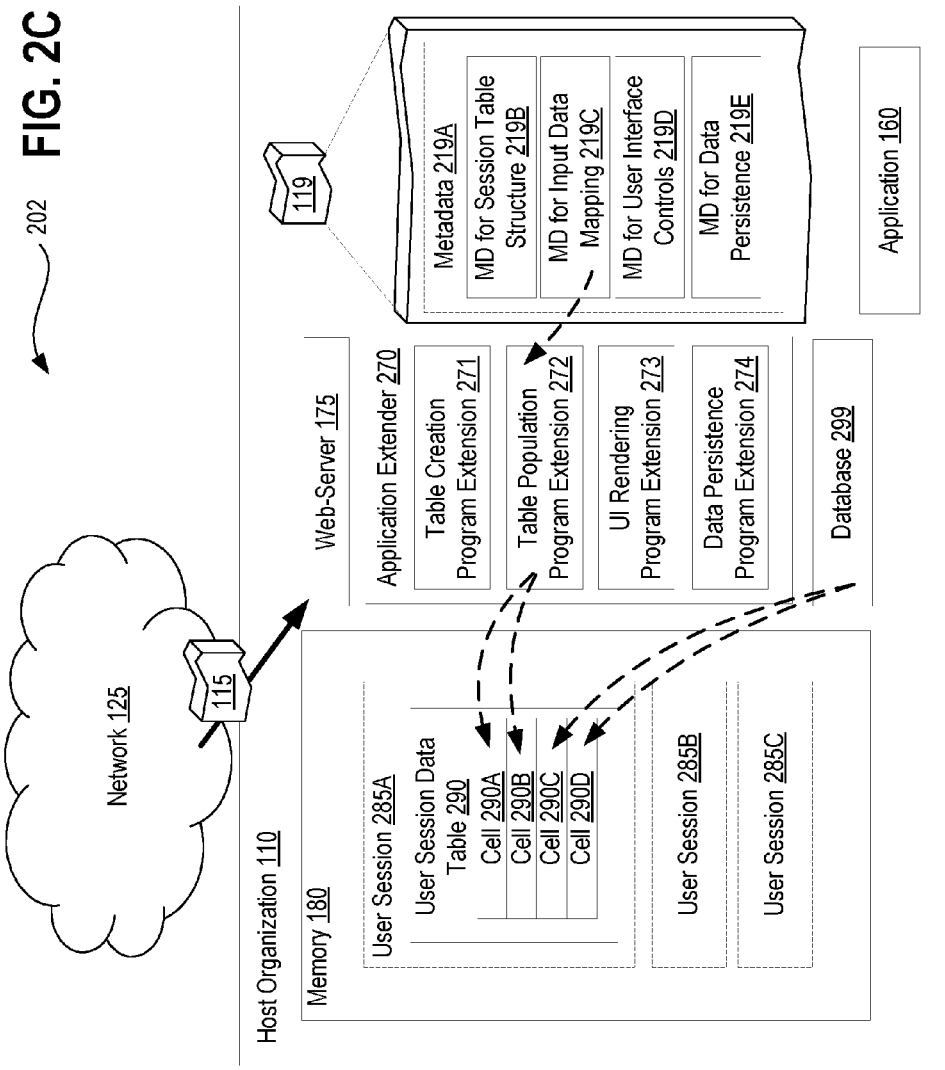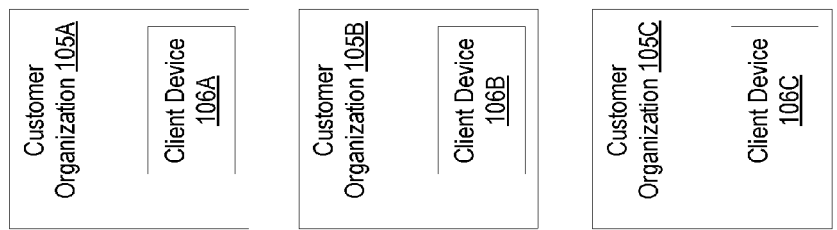

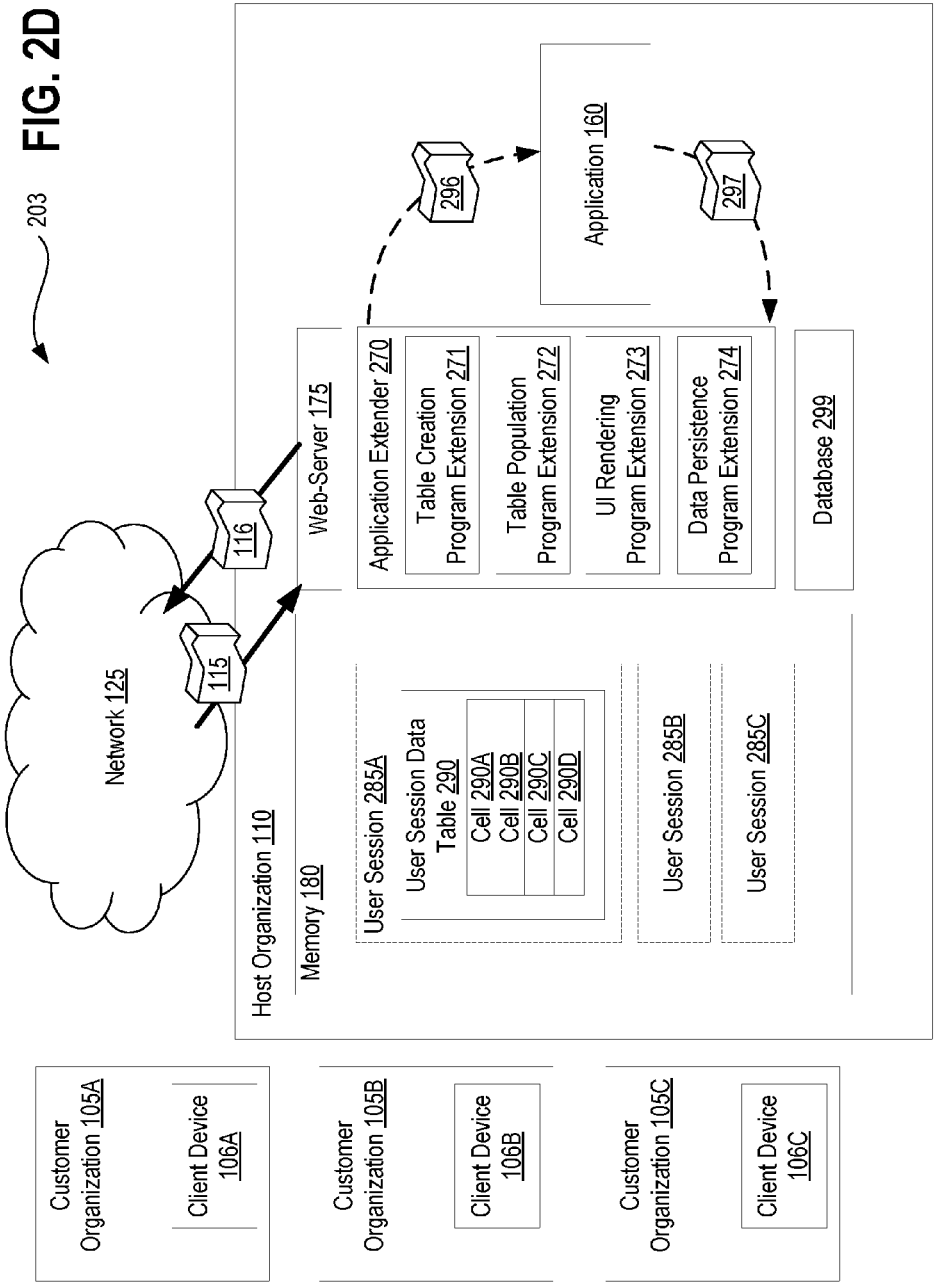

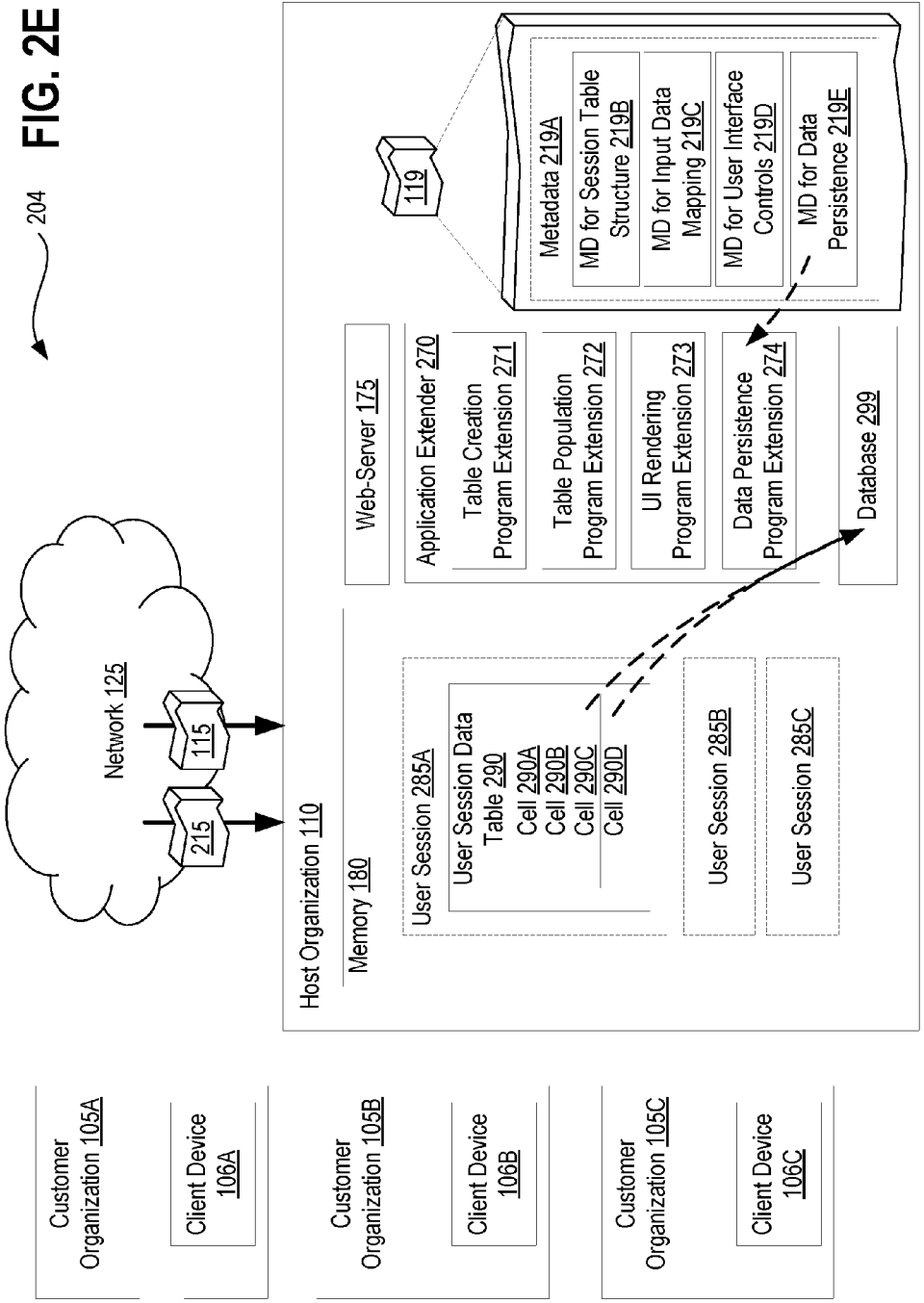

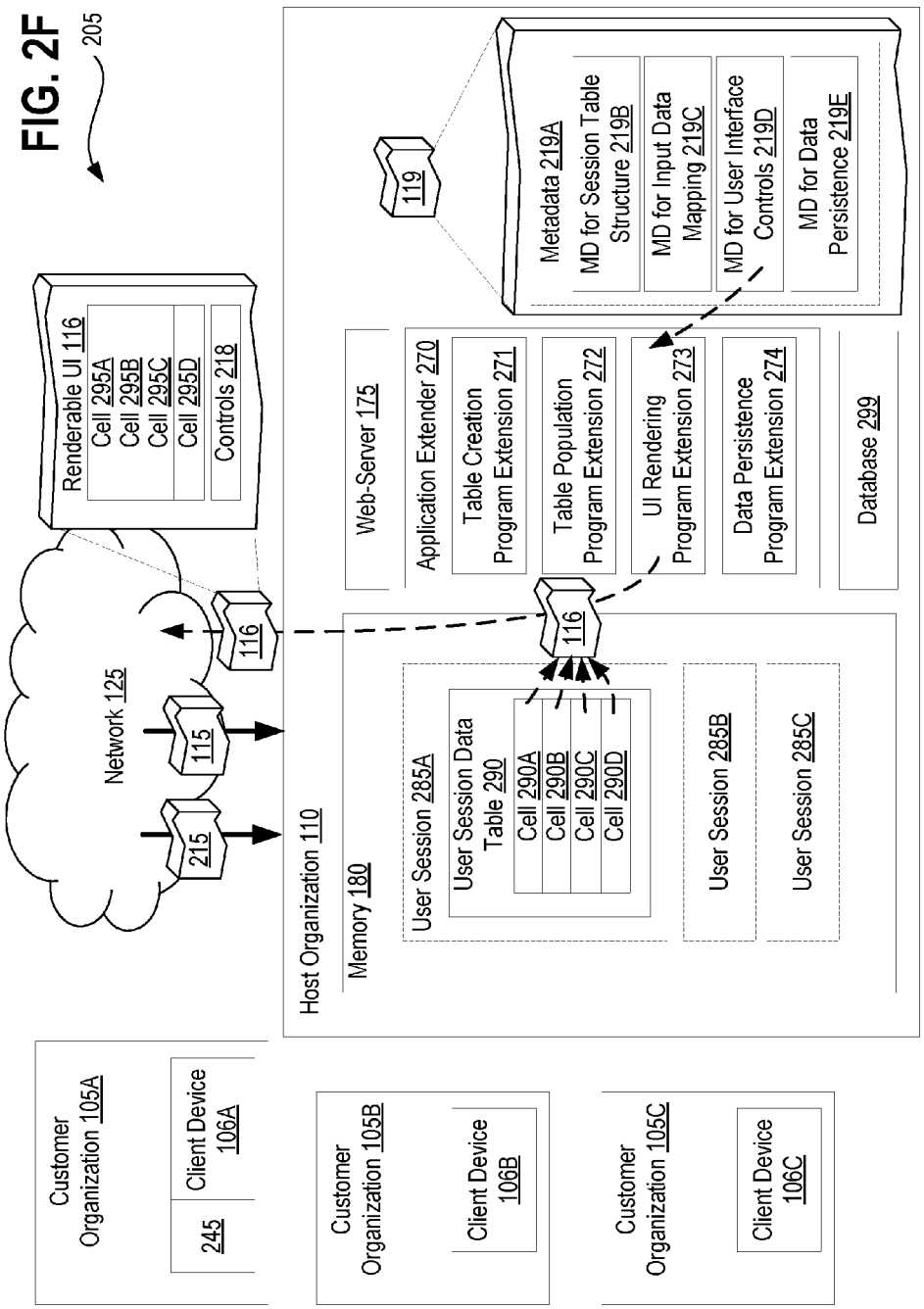

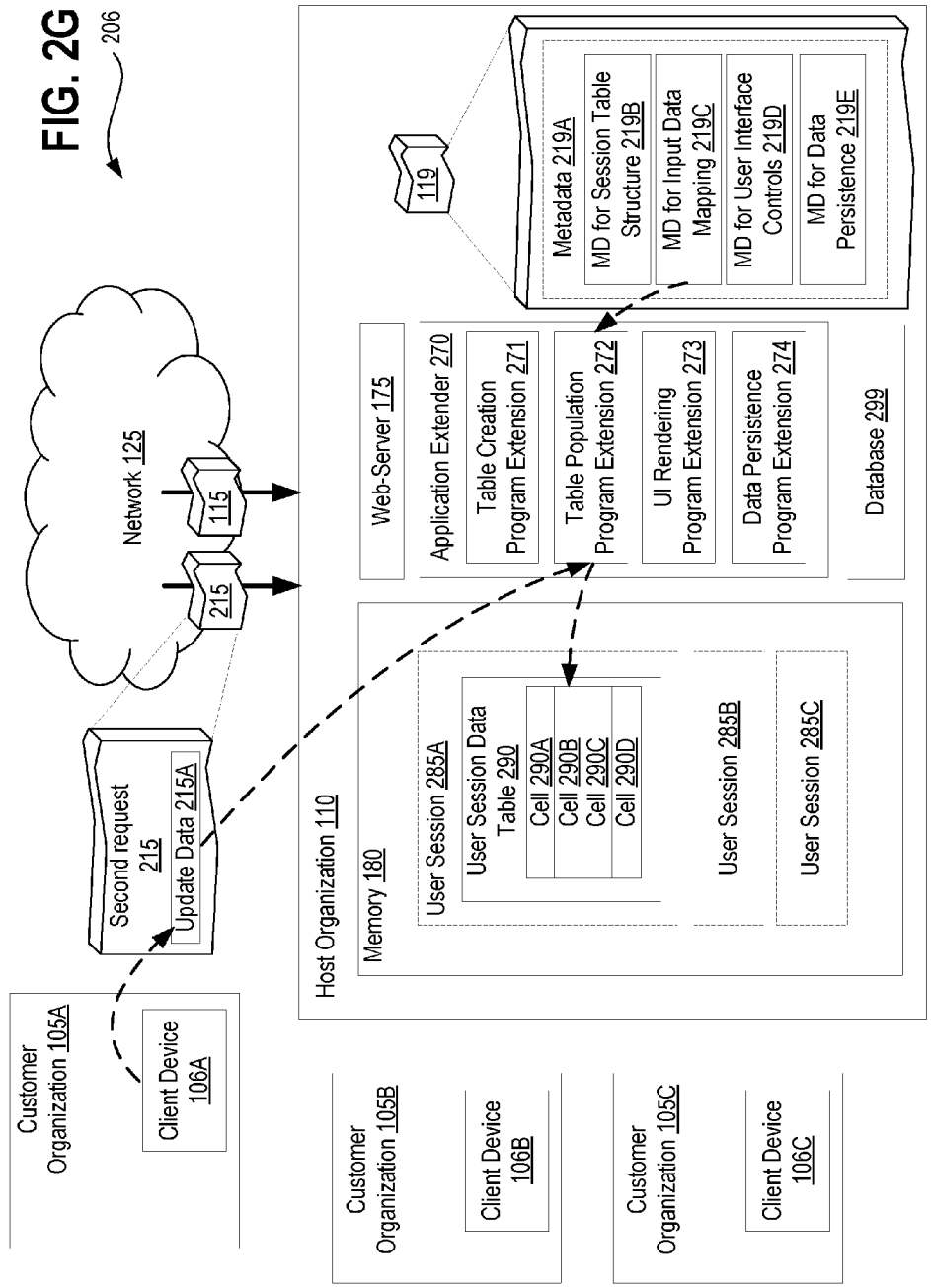

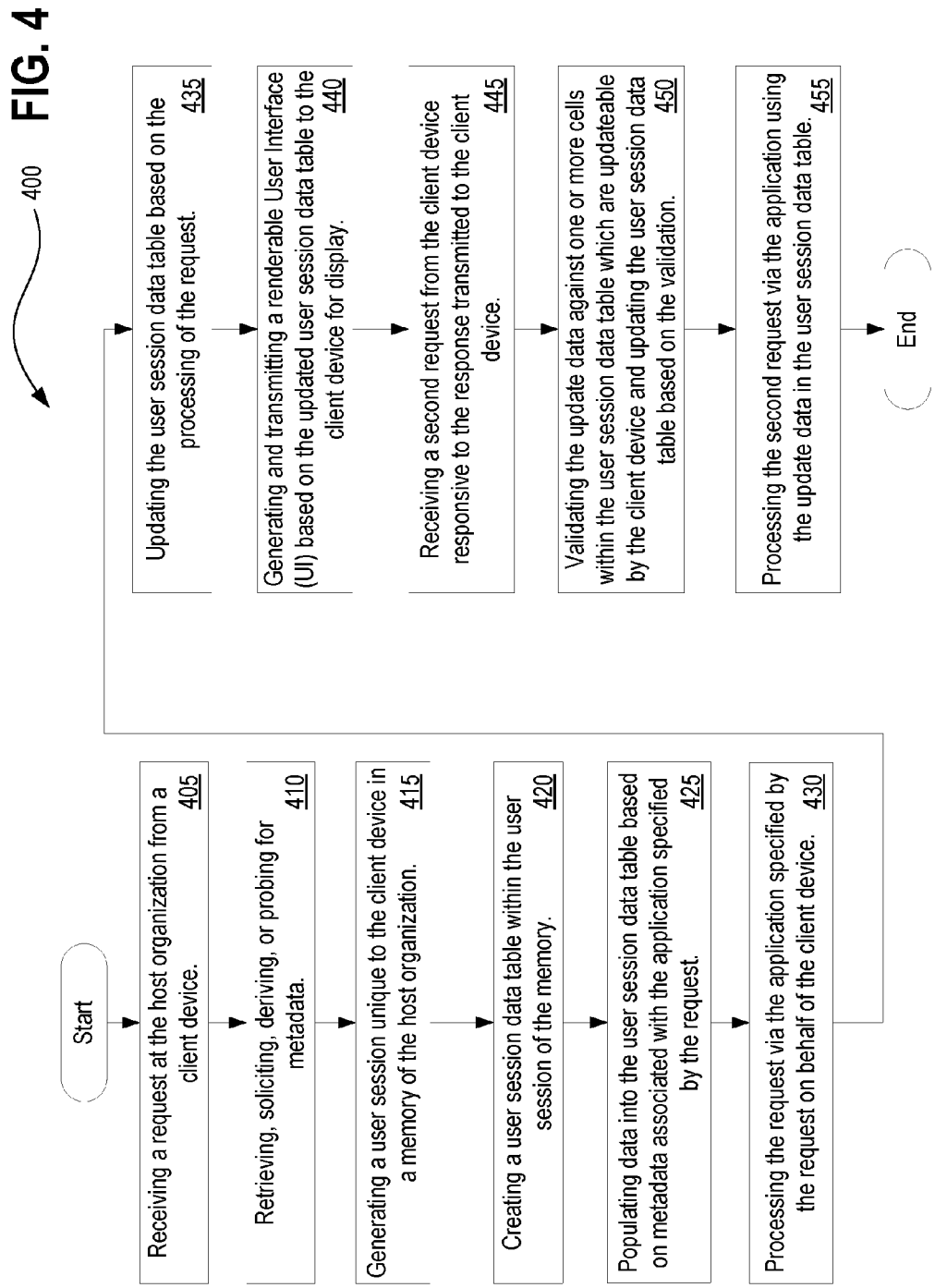

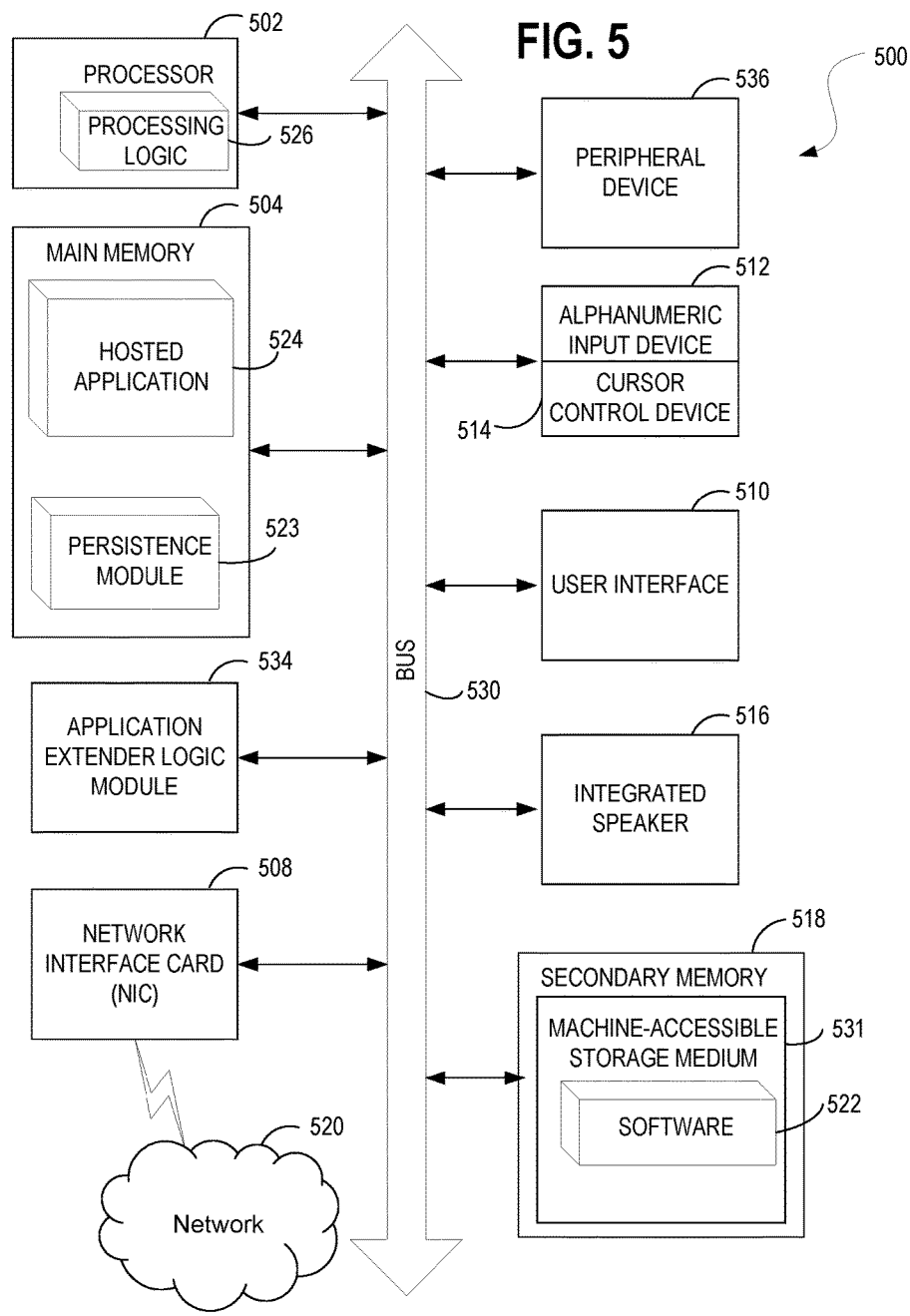

SESSION TABLE FRAMEWORK

CLAIM OF PRIORITY

This United States patent application is related to, and claims priority to, U.S. patent application Ser. No. 14/171,561 entitled "SESSION TABLE FRAMEWORK," filed Feb. 3, 2014, the entire contents of which are incorporated herein by reference; and is further related to, and claims priority to, U.S. patent application Ser. No. 13/208,206 entitled "SESSION TABLE FRAMEWORK," filed Aug. 11, 2011, the entire contents of which are incorporated herein by reference; and is further related to, and claims priority to, U.S. Provisional Patent Application No. 61/435,667 entitled "SESSION TABLE FRAMEWORK," filed Jan. 24, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate generally to the field of computing, and more particularly, to a session table framework, including methods, systems, and apparatuses for implementing a session table framework in an on-demand service environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to disclosed embodiments.

Developing comprehensive software applications from scratch is expensive in terms of both development time and also in terms of capital expenditure spent on developers, programmers, and the like, so as to create a software application capable of meeting design objectives.

Packaged software applications are sometimes available which meet many of the specified design objectives for a given project, and thus, it may be advantageous to purchase, license, or otherwise acquire a packaged software application (e.g., from a third party provider) and incorporate the packaged software application into an existing computing environment, rather than developing the necessary functionality from scratch.

Incorporating a packaged software application into a complex computing environment typically requires some level of customization, for example, customizations to fully integrate related business processes and data elements which are not fully managed within the scope of an "out-of-the-box" or packaged software application. Customization may further be desirable to provide additional security, additional functionality, or other enhancements which are not provided by the packaged software application.

The problem of incorporating a packaged application into a complex computing environment is exacerbated where it is not feasible to modify the underlying source code of the packaged application due to, for example, licensing restrictions, unavailability of the source code, and so forth.

The present state of the art may therefore benefit from a session table framework, including methods, systems, and apparatuses for implementing a session table framework in an on-demand service environment as described herein.

BRIEF DESCRIPTION OF THE DRAWINGS

Embodiments are illustrated by way of example, and not by way of limitation and will be more fully understood with reference to the following detailed description when considered in connection with the figures in which:

FIG. 1B depicts an alternative exemplary architectural overview of the environment in which embodiments may operate;

FIG. 2C depicts an alternative exemplary architectural overview of the environment in which embodiments may operate;

FIG. 2D depicts an alternative exemplary architectural overview of the environment in which embodiments may operate;

FIG. 2E depicts an alternative exemplary architectural overview of the environment in which embodiments may operate;

FIG. 2F depicts an alternative exemplary architectural overview of the environment in which embodiments may operate;

FIG. 2G depicts an alternative exemplary architectural overview of the environment in which embodiments may operate;

FIG. 4 is a flow diagram illustrating a method for implementing a session table framework in an on-demand service environment in accordance with disclosed embodiments; and FIG. 5 illustrates a diagrammatic representation of a machine in the exemplary form of a computer system, in accordance with one embodiment.

DETAILED DESCRIPTION

Figure 1A:
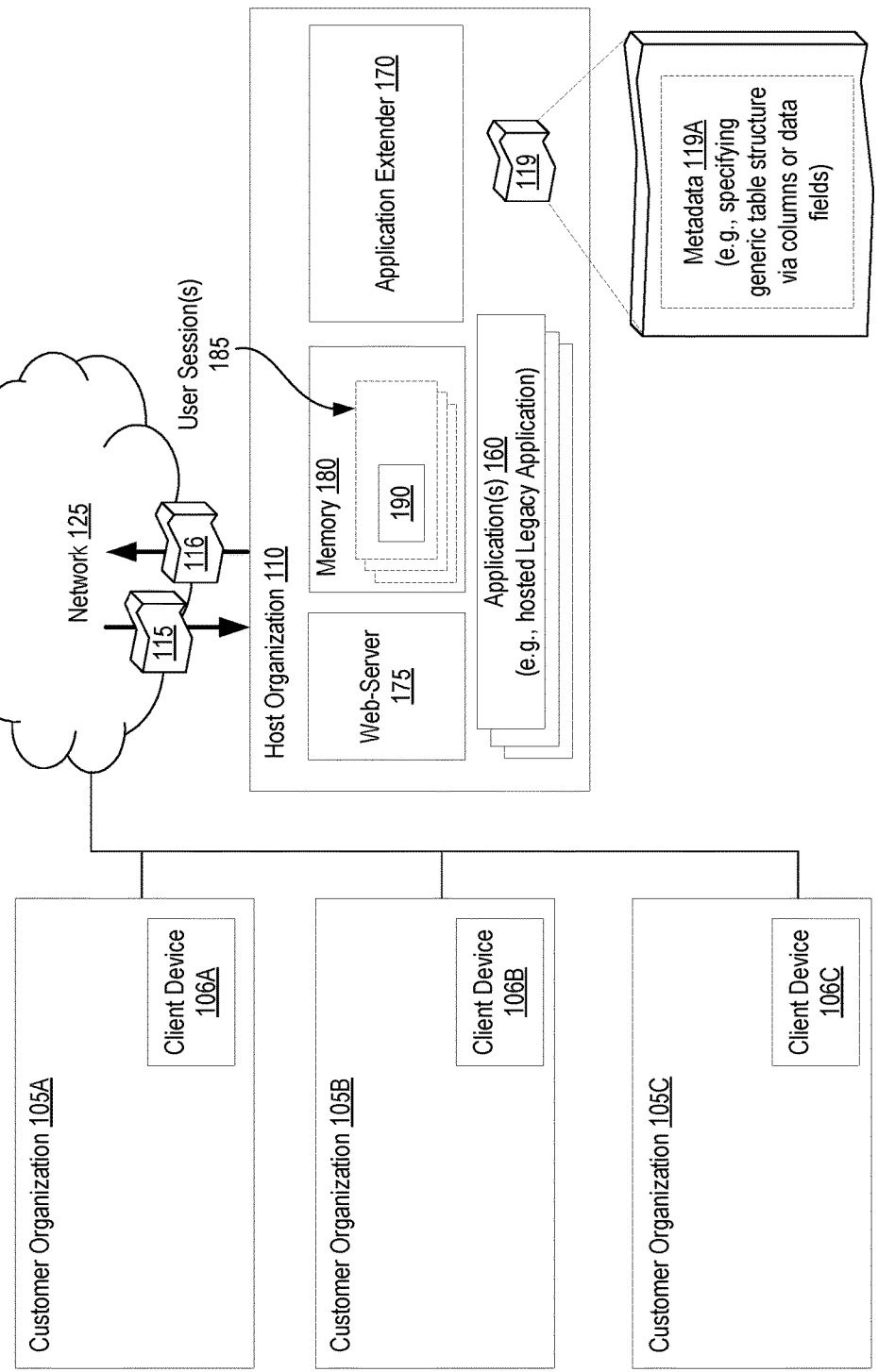
FIG. 1A depicts an exemplary architectural overview of the environment in which embodiments may operate.

Described herein are systems, devices, and methods for a session table framework, including methods, systems, and apparatuses for implementing a session table framework in an on-demand service environment, for example, mechanisms include supporting client state information for and on behalf of stateless applications.

In a particular embodiment, such mechanisms include: receiving a request at a host organization from a client device, in which such a request specifies an application available via the host organization; generating a user session unique to the client device in a memory of the host organization; creating a user session data table within the user session; processing the request via the application specified by the request on behalf of the client device; updating the user session data table based on the processing of the request; and transmitting a response to the client device responsive to the request.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1A illustrates an exemplary architecture 100 in which embodiments may operate. Architecture 100 depicts a host organization 110 communicably interfaced with several customer organizations (105A, 105B, and 105C) via network 125. Within the host organization 110 is a web-server 175, memory 180, application or applications 160 (e.g., a hosted legacy application available via the host organization), and application extender 170.

In one embodiment, the host organization 110 receives a request 115 from a client device 106A, 106B, or 106C, in which the request 115 specifies an application 160 available via the host organization 110. In such an embodiment, an application extender 170 of the host organization 110 generates a user session 185 which is unique to the client device 106A-C in a memory 180 of the host organization 110. The application extender 170 further creates a user session data table 190 within the user session 185 of the memory 180 and processes the request 115 via the application 160 specified by the request 115 on behalf of the client device 106A-C. In such an embodiment, the application extender 170 updates the user session data table 190 based on the processing of the request 115 and transmits a response 116 to the client device 106A-C responsive to the request 115.

Any number of user sessions 185 may be created for the one or more client devices 106A-C, such that any client device submitting a request 115 to the host organization may have a user session 185 which is unique to that particular client device, and thus dedicated to information specific to the respective client device 106A-C. Creating each of the user sessions 185 may include dynamically allocating space within the memory 180 for the creation of the user session 185. In some embodiments, the user sessions 185 are implemented as HttpSessions, in which a user session data table 190 is a memory-resident data table within the memory 180 of an application server supporting the corresponding user's HttpSession. The user session 185 may therefore serve as a communication path over which to pass new user data from a client device's 106A-C browser to relevant parts of functional processing within the host organization 110. Moreover, use of flexible metadata 119 to control both creating the user session data tables and also to maintain the records within them permits an application server's existing data maintenance capabilities to be leveraged.

Web-server 175 may be responsible for receiving requests 115 from various customer organizations 105A-C via network 125 and provide a web-based interface to an end-user client machine originating such requests 115, for example, a client device 106A-C at or operating within one of customer organizations 105A-C.

In one embodiment, the host organization 110 receives a request 115 from a client device (e.g., from one of 106A, 106B, or 106C). In such an embodiment, an application 160 is specified via the request 115, for example, as the destination or as the desired resource or processing facility for such the request 115.

Various types of applications 160 may be hosted or made available by host organization on behalf of client devices 106A-C and extendable via application extender 170. For example, in one embodiment application 160 is a legacy application executing within the host organization 110, the legacy application having source code which is unavailable for modification or unsupported for modification. For example, the legacy application may include useful processing capabilities yet nevertheless lack support by the original programmers or any technical team or organization capable of adequately modifying and updating the legacy application to reflect evolving business requirements.

In one embodiment, application 160 specified by the request 115 is a third party application for which source code is proprietary and unavailable for modification or for which the source code is restricted from modification due to licensing terms for the application. For example, either the source code simply is not available as it is kept secret from the host organization 110 or the source code is not available for modification because the host organization 110 lacks the rights, permissions, and privileges to modify the source code for the application 160.

In one embodiment, application 160 specified by the request 115 is a stateless application which maintains no state specific information regarding the client device (e.g., one of 106A-C) between a plurality of interactions between the application 160 and the client device. In such an embodiment, a user session data table implemented via the application extender 170 stores data uniquely associated with the client device 106A-C between the plurality of interactions with the client device on behalf of the stateless application. For example, the client device 106A-C may interact with the application 160 several times and thus, it may be beneficial if the application 160 maintained information associated with the client device 106A-C and its prior interactions in between the several interactions. However, where application 160 fails to implement such functionality, the application extender 170 may provide support for maintaining such state information between interactions.

The stateless application, were it to operate without the session table framework described herein, maintains only generic information between user clicks and user interactions, even where such interactions are associated with the same client device (e.g., one of 106A-C). Therefore, all required data and information to support user choices, selections, and updates have to be transmitted to the client device, and then the client device, by necessity, has to transmit all information (including its own choices, selections, and updates) back to the stateless application, again, if it were to operate without the session table framework described herein. Such interactions are not only inefficient due to transmitting all information back and forth, but additionally, such a model presents a security risk by allowing corrupted data, or maliciously altered data to be entered into the return data sent back to such a stateless application. For example, although only certain fields may be intended as user modifiable fields (e.g., quantity), corrupted or maliciously altered data may feasibly allow modification of a field intended as read-only/display-only (e.g., unit price), and that altered data may then be returned to the stateless application, which may accept the data as valid (e.g., a validly changed quantity of product at a maliciously altered unit price).

So as to overcome the above security flaw with a stateless model and to provide other enhancements, the session table framework described herein stores some data which is specific to a particular user or client device 106A-C, thus maintaining the data across multiple interactions with such a user or client device 106A-C. For example, in one embodiment, the user session data table 190 within the user session 185 of the memory 180 stores data/information between a plurality of interactions with the client device 106A-C on behalf of the stateless application 160. For example, the multiple interactions may include receipt of the original request 115 from the client device 106A-C, return of the renderable UI 116 from the host organization 110 to the client device 106A-C, and further receipt of a second request having updated data or other relevant data from the same client device 106A-C in the context of the same user session 185 created for the particular client device. Therefore, maintaining state information on behalf of the stateless application for interactions with the client device 106A-C is a desirable improvement.

In an alternative embodiment, application 160 specified by the request 115 supports a first data set on behalf of the client device 106A-C, however, the application 160 lacks support for a second data set. In such an embodiment, application extender 170 implements support for the second data set on behalf of the client device 106A-C as an extension or enhancement to the application 160. In such an embodiment, the second data set is different than, and complementary to, the first data set which is supported by the application 160.

In one embodiment, application 160 specified by the request 115 includes a proprietary black box application supporting an enumerated set of inputs and yielding an enumerated set of outputs responsive to the enumerated set of inputs. In such an embodiment, the implementing logic of the proprietary black box application which yields the enumerated set of outputs is not available for modification. Thus, in accordance with such an embodiment, application extender 170 applies further processing to the enumerated set of outputs yielded from the proprietary black box application. For example, where the source code or underlying logic for the proprietary black box cannot be modified to support further processing which is necessary in support of business objectives, the application extender 170 supports the capture of a known set of outputs from the proprietary black box and apply or facilitate the application of additional processing to the output, before such output is returned to a client-device 106A-C. In one embodiment, the further processing is applied before updating values in a user session data table maintained by the application extender 170 on behalf of the client-device 106A-C as an extension to the application 160.

The application extender 170 operates upon metadata 119 associated with the application 160 as will be described in additional detail below. In accordance with one embodiment, metadata 119A specifies a generic set of columns or data fields for use with the application 160 specified by the request 115. For example, metadata 119A may define a structure for a table to be created within a user session created on behalf of a client device 106A-C. Metadata 119A may further represent or specify conditions wherein a certain subset of the generic set of columns or data fields for application 160 is relevant to be used by a particular request, such as request 115. Metadata 119A may additionally or alternatively define a mapping between locations and/or cells within such a table and data to be populated into the table. Metadata 119A may additionally or alternatively define data persistence mapping for data within such a table and one or more locations where data may be persisted, such as within a database.

FIG. 1B depicts an alternative exemplary architectural overview of the environment 101 in which embodiments may operate. In particular, a multi-tenant database system 130 of the host organization 110 is depicted. The multi-tenant database system 130 depicted includes a plurality of underlying hardware, software, and logic elements 120 which implement database functionality and a code execution environment within the host organization 110. The hardware, software, and logic elements 120 of the multi-tenant database system 130 are separate and distinct from the plurality of customer organizations (105A, 105B, and 105C) which utilize the services provided by the host organization 110 by communicably interfacing to the host organization 110 via network 125. In such a way, host organization 110 may implement on-demand services, on-demand database services, or cloud computing services to subscribing customer organizations 105A-C. The computing infrastructure of the host organization 110 further enables the various customer organizations 105A-C to remotely execute applications and software within the host organization 110 without each subscriber customer organization having to locally host such applications and software. In some embodiments, the customer organizations 105A-C store information, such as transactional data, and other information relevant, or of potential use and interest with an application 160, within the multi-tenant database system 130 of the host organization 110. Therefore, the session table framework described herein provides for persisting data within the multi-tenant database system 130.

In accordance with one embodiment, the metadata 119 further defines a mapping between one or more cells in the user session data table 190 and a corresponding one or more locations in the multi-tenant database system 130 of the host organization 110. In such an embodiment, the host organization 110 further synchronizes data within the one or more cells in the user session data table 190 with the corresponding one or more locations in the multi-tenant database system 130 of the host organization 110 based on the mapping to persist the data in the one or more cells beyond the existence of the user session 185 for the client device (e.g., one of 106A-C corresponding to the respective user session 185).

In one embodiment, receiving the request 115 includes receiving the request at the host organization 110 having the multi-tenant database system 130 operating therein, in which the request 115 is one of a plurality of requests received from a plurality of customer organizations 105A-C. For example, each of the various requests may include requests for application processing, database transaction requests, search requests, status requests, and so forth, originating from the customer organizations 105A-C, each being a subscriber of on-demand services provided by the host organization 110. In one embodiment, each customer organization is an entity selected from the group consisting of: a separate and distinct remote organization, an organizational group within the host organization, a business partner of the host organization, or a customer organization that subscribes to cloud computing services provided by the host organization.

In one embodiment, the multi-tenant database system 130 includes elements of hardware and software that are shared by a plurality of separate and distinct customer organizations, each of the separate and distinct customer organizations being remotely located from the host organization having the multi-tenant database system 130 operating therein.

In one embodiment, the hardware, software, and logic elements 120 of the multi-tenant database system 130 include at least a non-relational data store 150 and a relational data store 155, which operate in accordance with the hardware, software, and logic elements 120 that implement the database functionality and code execution environment within the host organization 110.

Figure 2A:
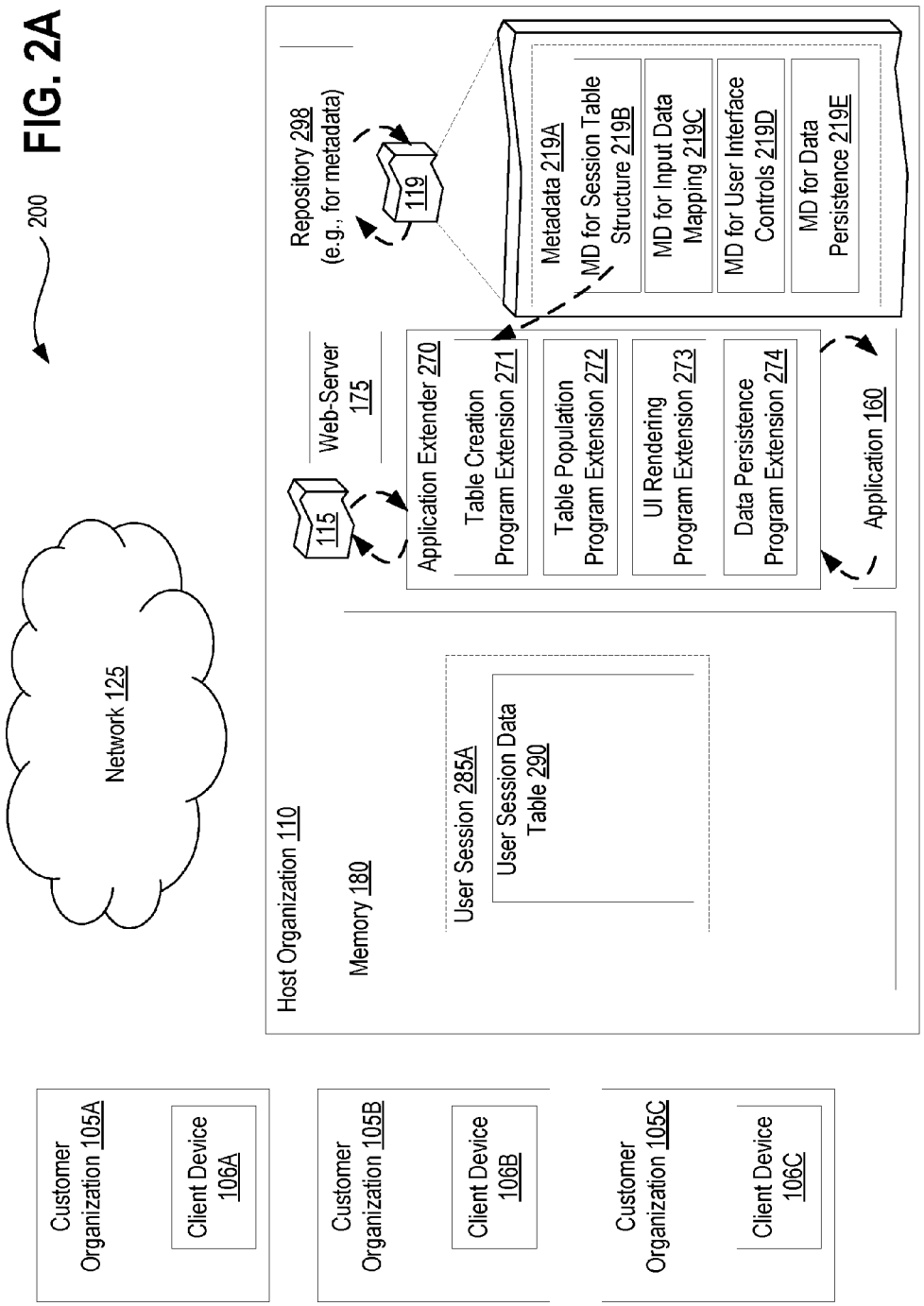
FIG. 2A depicts an alternative exemplary architectural overview of the environment in which embodiments may operate.

FIG. 2A depicts an alternative exemplary architectural overview of the environment 200 in which embodiments may operate. In particular, implementation of security enhancements and functionality enhancements via the described session table framework are described in additional detail.

In one embodiment, the host organization populates data into the user session data table 290 within a user session 285A based on metadata 119 associated with the application 160 specified by the request 115. Metadata 119 associated with the application 160 may be retrieved or derived from various sources. For example, in one embodiment, metadata 119 associated with the application and populated into the user session data table 290 is based on metadata 119 from a repository 298 separate from the application 160 which is specified by the request 115. In such an embodiment, the repository 298 has previously stored the metadata 119 for later retrieval. In an alternative embodiment, the metadata 119 is solicited or queried from the application 160 by referencing an Application Programming Interface (API) of the application to request the metadata 119. For example, queryable objects with publicly disclosed or publicly facing "get" methods (e.g., methods disclosed and accessible to separate programs external to application 160) may be utilized to interface with the application 160 and discover or interrogate what metadata is associated with the application 160.

In one embodiment, metadata 119 is derived from the received request 115 by systematically parsing a plurality of quantifiable data elements, data fields, columns, and/or name=value pairs from the received request. For example, where a request 115 is sent for processing by the specified application 160, that request will have information about the purpose and nature of the incoming request 115 which may be intercepted and extracted from the request 115 for use in building or supplementing metadata associated with the application 160. For example, enumerated and expected inputs to the application 160 may be embedded within such a request 115 and available for extraction via the application extender 270.

In one embodiment, the metadata 119 is retrieved or at least partially retrieved by probing the application 160 specified by the request 115 to yield application information to parse for quantifiable data elements, data fields, columns, and/or name=value pairs from output from the application responsive to the probe.

Additional detail is shown for application extender 270 which provides one or more program extensions to the application 160. For example, application extender 270 is depicted as including a table creation program extension 271; a table population program extension 272; a UI rendering program extension 273; and a data persistence program extension 274. The sub-elements of application extender 270 operate upon metadata 219A including the metadata for session table structure 219B, the metadata for input data mapping 219C, the metadata for user interface controls 219D, and the metadata for persistence 219E.

Figure 2B:
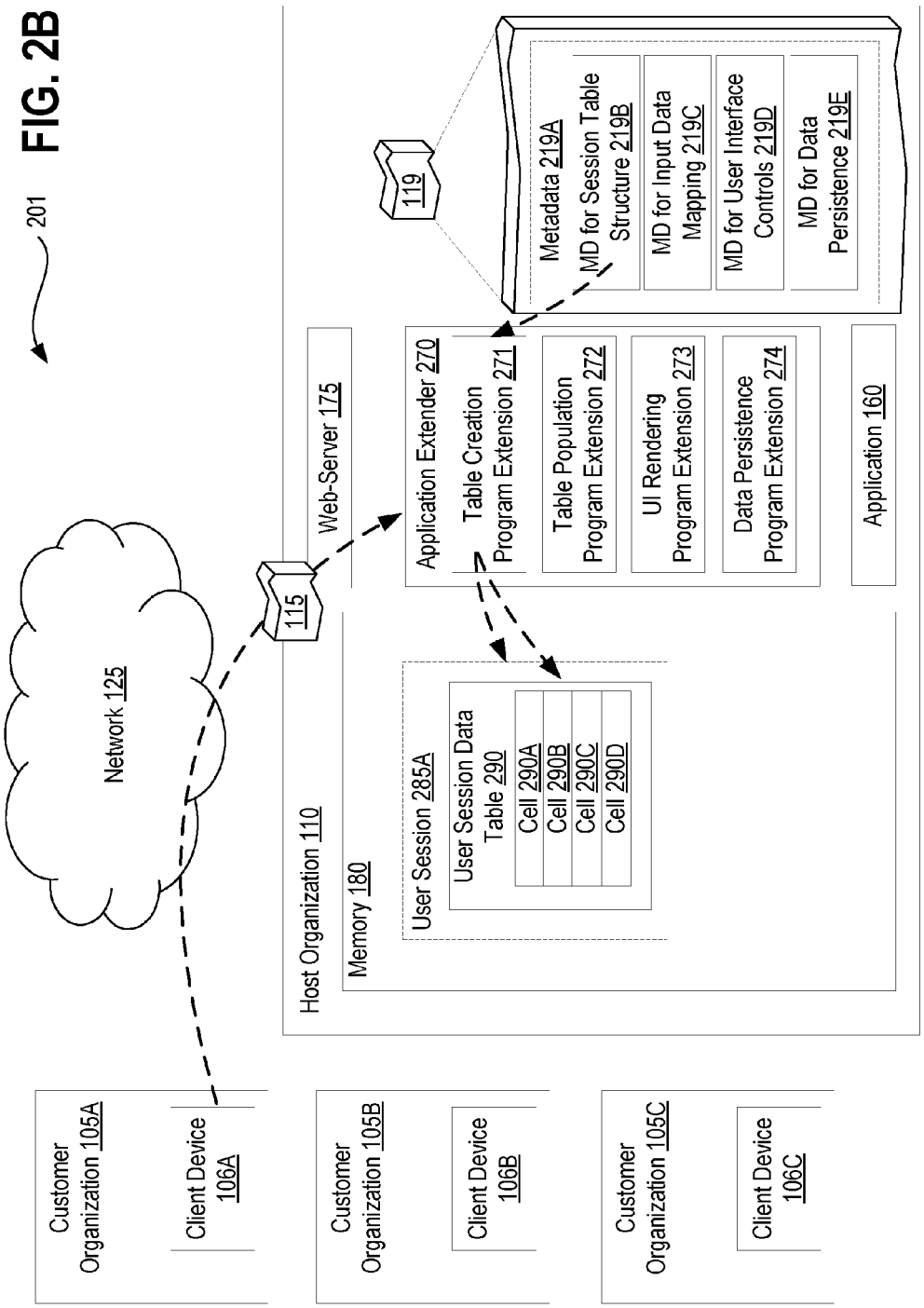
FIG. 2B depicts an alternative exemplary architectural overview of the environment in which embodiments may operate.

FIG. 2B depicts an alternative exemplary architectural overview of the environment 201 in which embodiments may operate.

Depicted here is the host organization 110 receiving a request 115 from client device 106A, responsive to which host organization 110 is expected to yield a response to the requesting client device 106A responsive to the request 115.

In accordance with the disclosed embodiments, both the client device 106A and the application 160 operate agnostic to existence of the application extender 270. Stated differently, the client device 106A and the application 160 need not be aware that application extender 270 acts as an intermediary to the requests 115 and responses 116, though each may have such awareness. Nevertheless, it is not necessary for the client device 106A or the application 160 to implement any special or additional processing. Instead, the hosted application 160 is extended by the application extender 270 in a manner that may be completely transparent to each of the client device 106A and the application 160, thus permitting backward compatibility with existing client-devices 106A-C and permitting enhanced capabilities for applications 160 which may not otherwise support alteration, update, or enhancements.

With reference to FIG. 2B, where an incoming request 115 is a first interaction, the table creation program extension 271 will generate a user session 285A unique to the client device 106A in a memory 180 of the host organization 110 based on the metadata 119 associated with the application 160 which is specified by the request 115.

In one embodiment, the metadata 219B defines a structure for the user session data table 290. In such an embodiment, creating the user session data table 290 within the user session 285A of the memory 180 constitutes creating the user session table 290 based on the structure defined within the metadata 219B of the metadata 119. For example, the session table structure defined by metadata 219B may specify one or more columns, one or more rows, and/or a plurality of locations or cells, such as cells 290A, 290B, 290C, and 290D within the user session data table 290.

In one embodiment, a table creation program extension 271 operates to create the user session data table 290 within the user session 285A of the memory based on the metadata 119 associated with the application 160.

FIG. 2C depicts an alternative exemplary architectural overview of the environment 202 in which embodiments may operate.

In accordance with one embodiment, the metadata 219C defines a mapping between a plurality of data elements and a plurality of corresponding target locations within the structure defined by the metadata 219B (e.g., the structure defined by metadata 219B used to create user session data table 290). In such an embodiment, populating data into the user session data table 290 constitutes storing each of the plurality of data elements into one or more rows or one or more cells 290A-D of the user session data table based on the mapping defined by the metadata 219C. User session 285B and user session 285C are additionally depicted, each corresponding to, and unique to, a different user than the user associated with user session 285A.

In one embodiment, each of the plurality of data elements are provided within the metadata 119 or are retrievable from a source location separate from the metadata 119 as specified by the metadata 219C. For example, the metadata specifying the mapping for input data 219C may specify the retrieval of data elements from within the metadata 119 and such data is therefore populated into the one or more rows or one or more cells 290A-D of the user session data table 290 based on the input data mapping 219C. Other data elements may be located separately, such as within a file store or within a database 299, and therefore, such data elements are retrieved based on the input data mapping metadata 219C and populated into the one or more rows or one or more cells 290A-D of the user session data table 290. In some embodiments, at least a portion of the plurality of data elements are sourced or extracted from the request 115, as specified by the metadata 119.

Thus, in accordance with one embodiment, populating the data into the user session data table 290 further includes retrieving each of the plurality of data elements from the metadata 119 or from the source location (such as within database 299) specified by the metadata 219C and storing each of the plurality of data elements retrieved into the one or more rows or cells 290A-D of the user session data table 290.

In such a way, the application extender 270 operates on behalf of one or more hosted application(s) (e.g., 160) by systematically processing metadata 119 associated with each particular application 160 without specific dependency to any particular application 160 so long as appropriate metadata 119 associated with the one or more applications 160 may be derived or retrieved as described above.

In one embodiment, a table population program extension 272 operates to populate data into the user session data table 290 by storing each of the plurality of data elements into the one or more rows of the user session data table 290 based on the mapping defined by the metadata 219C.

In one embodiment, the metadata 219A further defines one or more data elements necessary to support a plurality of business rules embedded within the metadata 119, such as business rules introduced as enhancements or extensions to the existing capabilities of the application 160 being extended. In such an embodiment, creating the user session data table 290 further includes creating one or more data elements necessary to support each of the plurality of business rules defined by the metadata 119. In such an embodiment, the metadata 219C defines a mapping between the one or more data elements necessary to support each of the plurality of business rules defined by the metadata 219A and a plurality of corresponding locations within the structure defined by the metadata (such as the locations or cells 290A-D within user session data table 290).

FIG. 2D depicts an alternative exemplary architectural overview of the environment 203 in which embodiments may operate. In particular, processing of the request 115 via the application 160 on behalf of the requesting client device 106A-C is shown in additional detail.

In accordance with one embodiment, the application extender 270 processing the request 115 via the application 160 specified by the request on behalf of the client device 106A-C includes the application extender 270 performing one of the following operations: a) submitting the received request 115 in an unmodified form to the application 160 on behalf of the client device 106A-C and receiving output from the application responsive to the submitted request. For example, where the request 115 received at the host organization 110 is in a state appropriate for processing by the specified application 160, the originally received request 115 may be simply submitted to the application 160 as depicted at 296. The application 160 will responsively generate output or a reply as depicted at element 297, and that output or reply is then captured, intercepted, or received by the application extender for further processing and operations.

In one embodiment, processing the request 115 via the application 160 specified by the request on behalf of the client device 106A-C includes the application extender 270 performing: b) generating an intermediate request based on the received request, submitting the intermediate request to the application on behalf of the client device as depicted at 296, and capturing output from the application responsive to the submitted intermediate request as depicted by element 297. For example, it may be necessary to modify the request presented to the application 160 such that the output is directed to the application extender 270 or such that input presented to the application 160 is transformed into a state or format which is compatible with the application 160 where the originally received request 115 fails to format the request appropriately. In one embodiment, an intermediate request which is generated subsequent to a second request from a client device 106A (e.g., as shown at element 215 of FIG. 2E depicting a second request) utilizes data previously stored in the user session data table 290 in addition to data from within the second request received. For example, a second request from the client device may be incomplete, but may be supplemented by the application extender 270 based on previously captured data stored in the user session data table 290.

In one embodiment, processing the request 115 via the application 160 specified by the request on behalf of the client device 106A-C includes the application extender 270 performing: c) submitting a plurality of Application Programming Interface (API) requests (as shown at element 296) to the application 160 on behalf of the client device 106A-C to fulfill operations solicited by the request 115 received from the client device 106A-C, and capturing output from the application responsive to the plurality of API requests as depicted at element 297. For example, where the application 160 provides a programmatic interface for triggering or requesting processing, such an interface may be utilized to present or submit API requests which in the aggregate fulfill the work which is dictated by the originally received request 115.

Having the output 297 yielded from the application 160, the application extender 270 then updates the user session data table 290 appropriately. For example, in accordance with one embodiment, updating the user session data table 290 based on the processing of the request includes one or more of the following operations: a) modifying one or more cells in the user session data table 290 based on output received from the application 160, in which the one or more cells being modified are based on a portion of the output 297 represented by or corresponding to a change to existing data cells of the user session data table; b) adding one or more columns to the user session data table 290 based on the output 297 received from the application 160, in which the one or more columns being added are based on a portion of the output corresponding to one or more fields previously unrepresented by the user session data table (e.g., new data elements or new data fields represented in the output 297 trigger the insertion of new columns); and c) adding one or more rows to the user session data table based on the output received from the application 160, in which the one or more rows being added are based on a portion of the output corresponding to one or more elements previously unrepresented data one or more existing columns within the user session data table (e.g., the columns are already present but output 297 from the application 160 triggers the insertion of new rows).

In accordance with the disclosed embodiments, the response 116 which is sent back to the client device 106A-C is a reflection of the updates which are written into the user session data table 290 based on the output 297 from the application 160. In such a way, subsequent processing, appropriate formatting, necessary synchronization, and designated persistence mapping may be fulfilled responsive to receiving the output 297 from the application 160. Additionally, having the update data written to and reflected by the user session data table 290 facilitates subsequent requests (e.g., second request 215 from FIG. 2E) from the same client device 206A-C and directed to the same specified application 160 as much of the state information will already be known, and changes reflected in the second request 215 may be appropriately validated against permissibly modifiable fields as described in additional detail below.

FIG. 2E depicts an alternative exemplary architectural overview of the environment 204 in which embodiments may operate.

In accordance with one embodiment, metadata 219E defines data persistence between one or more cells 290A-D or locations in the user session data table 290 and a corresponding one or more data persistence locations in a database 299 of the host organization 110. Alternatively, the data persistence may be defined with the input data mapping defined by metadata 219C. Metadata 219E defining data persistence mappings may additionally or alternatively specify that one or more cells 290A-D or locations in the user session data table 290 are to be persisted in a multi-tenant database system (e.g., element 130 at FIG. 1B) or an alternate file store.

In one embodiment, based on data persistence defined by metadata 219E, the host organization synchronizes data within the one or more cells 290A-D or locations in the user session data table 290 with the corresponding one or more data persistence locations in the database 299 system of the host organization 110 based on the mapping (or based on the data persistence defined by metadata 219E) to persist the data in the one or more cells beyond the existence of the generated user session 285A unique to the client device 106A in the memory of the host organization 110 on behalf of the client device 106A.

In one embodiment, a data persistence program extension 274 operates to synchronize data within the one or more cells 290A-D or locations in the user session data table 290 with the corresponding one or more data persistence locations (e.g., as specified by metadata 219E). In such an embodiment, the data persistence program extension 274 further operates to synchronize updated data within the one or more cells 290A-D or locations in the user session data table 290 with the corresponding one or more data persistence locations (e.g., within database 299) when the one or more cells 290A-D or locations in the user session data table 290 are updated responsive to update data received within a second request 215 received from the client device 106A. For example, where a client device 106A-C engages in multiple interactions with the application 160, new data, modified, updated or changed data, or deleted data determinable from the second request 215 (or subsequent request after a first request) is synchronized back to the user session data table previously established for that client device 106A-C. Such synchronization or updating may be fulfilled via table population program extension 272 with respect to updating the user session data table 290 and fulfilled via the data persistence program extension 274 with respect to persisting data (e.g., as specified by persistence mappings in the metadata 119) to separate file stores and databases on behalf of the client device 106A-C for data which requires persistent storage beyond the existence of a user session 285A-C for the client device 106A-C.

FIG. 2F depicts an alternative exemplary architectural overview of the environment 205 in which embodiments may operate.

In accordance with one embodiment, transmitting the response 116 to the client device 106A-C responsive to the request 115 includes generating a renderable User Interface (UI) based on the updated user session data table 290 and transmitting the renderable UI to the client device 106A-C for display, responsive to receiving the request 115.

In one embodiment, the metadata 219D further defines a plurality of controls 218, each control specifying display logic for one or more of the plurality of data elements as specified by the mapping defined within the metadata 219C of the metadata 119. For example, the controls 218 associate particular data elements with one or more display elements (e.g., text boxes, labels, lists, check boxes, etc.). In one embodiment, generating the renderable UI 116 is based on the metadata 219D of the metadata 119 and based further on the data in the user session data table 290. For example, in one embodiment, generating the renderable UI 116 includes: incorporating each of the plurality of controls 218 defined by the metadata into the renderable UI 116; incorporating, for each of the plurality of controls 218, the display logic specified by each control into the renderable UI 116; and incorporating each of the plurality of data elements into the renderable UI 116 based on the display logic specified by each control 218, wherein each of the plurality of data elements are retrieved from the user session data table 290. For example, once the user session data table 290 is populated based on the input data mapping metadata 219C, such data elements may then be taken from the user session data table 290, rather than having to retrieve them from other locations. As depicted, data elements are incorporated into the renderable UI 116 within cells 295A, 295B, 295C, and 295D, for example, as retrieved from, and corresponding to, cells 290A-D. In accordance with one embodiment, a UI rendering program extension 273 operates to generate the renderable UI 116.

The controls 218 and their display logic may be utilized to define and incorporate into the renderable UI 116, UI events and UI elements such as custom check boxes and check box chains (e.g., related or forced selection/force exclusion of one or more check boxes based on the activation of another), UI locks, custom links/URLs/pointers, etc., custom display types, custom UI entry types, and so forth. Controls 218 and their UI elements may be incorporated into a renderable UI 116 transmitted to the client device 106A-C and integrated with transactional data and other data, systems, and functionality provided within the host organization's 110 on-demand services and cloud computing infrastructure.

In one embodiment, subsequent to the host organization 110 transmitting the renderable UI 116 to the client device (e.g., one of 106A-C), the client device displays the renderable UI 116 via a display device 245 communicatively interfaced with the client device (e.g., 106A), in which displaying the renderable UI 116 includes rendering display elements at the client device 106A corresponding to the plurality of controls 218 incorporated into the renderable UI 116 transmitted to the client device 106A by the host organization 110.

In one embodiment, each of the plurality of controls 218 incorporated into the renderable UI 116 define at least one event selected from the group of events which includes: a read event specifying a source location from which to read data to be displayed via the renderable UI 116 (e.g., data may be sourced from within the multi-tenant database system 130, from another database 299, from a location in memory 180, from a file store, an so forth). The group of events further includes a display only event specifying that data displayed is not updateable by the client device via the renderable UI 116 (e.g., identifying non-writeable, non-modifiable, and non-updatable cells, such as one of cells 295A-D within the renderable UI 116); and an input text event designating input received from a rendered field at the client device 106A-C as update data for a UI entry field (e.g., an updateable, modifiable, or writable cell among cells 295A-D) and further designating a target location in the user session data table 290 in which to store the update data (e.g., designating one of cells 290A-D as an updateable cell).

In accordance with one embodiment, transmitting the renderable UI 116 to the client device 106A for display includes transmitting a single web page having dynamic presentation logic therein to the client device 106A for rendering via a web browser, in which the single web page includes presentation logic to render the plurality of controls 218 and logic to receive update data from the client device 106A, via the single web page, for submission to the host organization 110 from the client device 106A within a second request 215.

In one embodiment, the dynamic presentation logic of the single web page updates a rendering of the plurality of controls 218 at the client device 106A responsive to receiving the update data from the client device 106A, when the update data received affects one or more dynamically calculable fields rendered by the presentation logic of the single web page. For example, code may be utilized within the dynamic presentation logic and/or the single web page to define one or more relationships between various displayed elements; such code may be introduced into the dynamic presentation logic and/or the single web page based on the metadata 219A. For example, the metadata 219D for user interface controls may provide the source for such dynamic presentation logic in accordance with some embodiments, responsive to which the UI Rendering Program extension 273 invokes javascript or similar programming constructs dynamically based on the metadata 219D. In one embodiment, a control (e.g., one control) is embedded into the single web page, in which the lone control is responsible for controlling multiple behaviors, to display multiple sets of data.

In some embodiments, when received update data affects a displayed element, the dynamic presentation logic calculates, and then appropriately displays the calculated value via the single web page, rather than initiating an exchange with the host organization 110. A simple example of a calculable field is that of, for example, an extended price, which may be defined simply as unit price multiplied by a quantity. In such an example, the extended price may be a display only field (e.g., not a UI entry field), as there is not likely a need to manually calculate and enter the extended price into a computer implemented UI. Instead, if either unit price or quantity were to be updated by client device 106A, the received update data may be utilized by the dynamic presentation logic to calculate and re-render or update the rendering of the appropriate control, based on the dynamic presentation logic and a defined relationship between the fields. Eventually, the update data (e.g., either quantity or unit price, or both in this example) is returned to the host organization 110 with the second request 215 and written into the user session data table 290 as appropriate. Dynamic presentation logic may be implemented via, for example, php, peri, asp, jsp, javascript, rails, and other such appropriate web technologies capable of implementing dynamic presentation logic.

In one embodiment, the dynamic presentation logic of the single web page implements a plurality of tabs for individual display at the client device 106A, in which each of the plurality of tabs is to display a first subset of the plurality of controls 218 and to hide from display, a remaining subset of the plurality of controls 218. Only one tab need be displayed at a time via client device 106A, yet all the tabs and the relevant controls (having the appropriate display logic) may be embedded within/defined by the dynamic presentation logic of the single web page, in which the single web page is included with, or corresponds to the renderable UI 116 transmitted to the client device 106A from the host organization 110. In such an embodiment, each tab operates in the context of the other tabs. Thus, while dozens or hundreds of discrete elements may be selectable via the first tab, only those selected elements from the first tab will cause the second tab to present/display/render UI entry fields (e.g., via the controls 218) for contextually appropriate elements on the second tab. Alternatively, refreshable pages may be utilized in place of tabs, in which subsequent pages refresh in accordance with the dynamic presentation logic of the single web page, without initiating interaction with the host organization 110.

FIG. 2G depicts an alternative exemplary architectural overview of the environment 206 in which embodiments may operate.

In one embodiment, the host organization 110 further receives the second request 215 from the client device 106A having update data 215A therein and the host organization 110 further a) validates the update data 215A against the one or more cells within the user session data table which are updateable (e.g., updateable cell 290B within cells 290A-D may be designated as an updateable cell) by the client device 106A; and b) updates the one or more cells within the user session data table which are updateable (e.g., updateable cell 290B within cells 290A-D) with the update data 215A from the client device 106A-C based on the validation. For example, pursuant to successful validation, the update data 215A may be written into updateable cell 290B. Alternatively, should the validation fail (e.g., cell 290B is not designated by the metadata (e.g., such as by the metadata for input data mapping 219C as being modifiable, updateable, or writeable based on user supplied data), an error message may responsively be generated and the write/update/modification will fail. In such a way, the user device is prevented from successfully presenting corrupted or maliciously altered data into the user session data table 290.

In an alternative embodiment, validation may additionally include comparing the update data 215A provided against various validation masks. For example, the update data 215A may be compared against an allowable range, against a minimum or maximum threshold, against a data type (e.g., character only, digit only, date only, min-length, max length, one of an enumerated set, etc.). Where a validation mask is utilized, non-compliance with such a validation mask may additionally trigger an error message and a write or update failure, regardless of whether or not the cell (e.g., one of 290A-D) is designated as being updateable.

When a second request 215 is received by the host organization 110, the application will again process its metadata 119. However, the application extender 270 will process any update data 215A by updating the user session data table 290 based on the properly updated and validated information submitted by the client device 106A-C. In such an embodiment, the client device 106A-C need not submit all data back to the host organization which was included in a renderable UI 116 sent to the client by the host organization, but rather, only updated information or modified information need be submitted back to the host organization 110 within a second request 215. In some embodiments, the client device 106A-C may additionally identify a user session, such as user session 285A for client device 106A.

Update data 215A received may be reflected within the user session data table 290 via the application extender 270 conducting further processing of the second request 215. For example, further processing my be conducted via the table creation program extension 271 which may introduce additional columns or data fields, if necessary, or further processing my be conducted with the table population program extension 272 which may populate or update data within the user session data table 290 based on the update data 215A. Application extender 270 then repeats the first processing operation in view of the update data 215A associated with the second request 215 via the application 160. For example, refer again to FIG. 2D at elements 296 and 297 in which the application extender 270 facilitates processing of the request 115 (or second request 215) via the application 160 on behalf of the requesting client device 106A-C.

The application extender 270 and its constituent program extensions 271-274 may then process any output or response received from application 160, similar to that which is depicted at FIG. 2D for the responsively generated output 297. In this example, such processing is on behalf of a client device which is already being interacted with, such as 106A.

By processing the metadata associated with application 160 and whatever application output is yielded by the application 160 and reflected in the updated user session data table 290, the application extender 270 remains completely dynamic, such that it does not hardcode or maintain specific table structures, specific input data mappings, specific data persistence mappings, specific controls, and so forth. Instead, the application extender 270 and its sub-components may instead dynamically process any metadata 219A between each of several interactions with a same client device (e.g., 106A), and between each of several interactions with different client devices 106A-C, thus providing a flexible framework for implementing a session table framework which provides, for example, enhanced security and also state information between interactions with a particular client, despite the application 160 operating as a stateless implementation.

In one embodiment, a non-transitory computer readable storage medium having instructions stored thereon supports execution of the instructions via a system, such as a system within host organization 110. In such an embodiment, when the instructions are executed by a system having a processor and memory therein, the instructions cause the system to perform a method, perform operations, or implement computer executable instructions which include: receiving a request 115 from a client device 106A-C, in which the request 115 specifies an application 160 available via the host organization 110; generating a user session (e.g., one of 285A-C) which is unique to the client device 106A-C in a memory 180 of the host organization 110; creating a user session data table 290 within the user session 285A-C of the memory 180; processing the request 115 via the application 160 specified by the request 115 on behalf of the client device 106A-C; updating the user session data table 290 based on the processing of the request 115; and transmitting a response 116 to the client device 106A-C responsive to the request 115.

Figure 3:
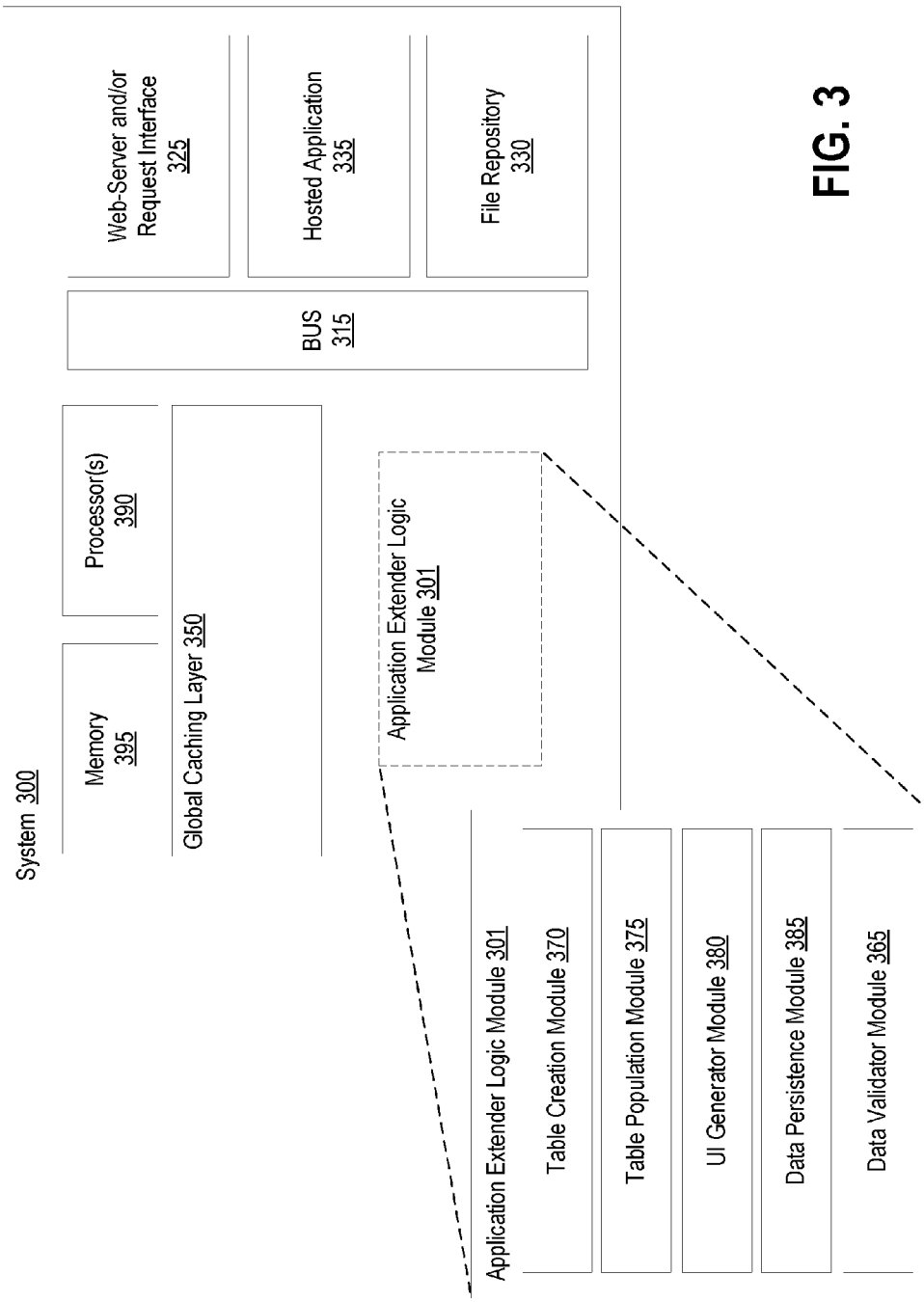
FIG. 3 shows a diagrammatic representation of a system in which embodiments may operate, be installed, integrated, or configured.

FIG. 3 shows a diagrammatic representation of a system 300 in which embodiments may operate, be installed, integrated, or configured.

In one embodiment, system 300 includes a memory 395 and a processor or processors 390. For example, memory 395 may store instructions to be executed and processor(s) 390 may execute such instructions. System 300 includes bus 315 to transfer transactions and data within system 300 among a plurality of peripheral devices communicably interfaced with bus 315. System 300 further includes web-server and/or request interface 325, for example, to receive data requests, return responses, and otherwise interface with remote clients, such as client devices located within customer organizations 105A-C. Web-server and/or request interface 325 may operate as a request interface to receive requests, second requests, and/or other transactions and service requests on behalf of the host organization in which the system 300 operates. Some transactions received at web-server 325 may be transaction requests to be transacted against a multi-tenant database system communicably interfaced with the host organization in which the system 300 operates.

System 300 is further depicted as having a hosted application 335 capable of performing processing at the request of an application extender (e.g., such as application extender logic module 301 or application extender 270) and indirectly on behalf of a requesting client device 106A-C. File repository 330 provides storage as necessary for the system 300, for example, to store metadata 119 on behalf of an application extender and to store other data which may be sourced into a user session data table, and so forth. Global caching layer 350 provides caching services to communicably interfaced devices and systems and in particular, provides caching of status information and defined rules, defined controls, and transactional data retrievable based on or in support of defined business rules and/or controls, etc., in accordance with the fulfillment of requests received from client devices of the customer organizations.

Distinct within system 300 is an application extender agent or an application extender logic module 301 which includes Table creation module 370, table population module 375, UI Generator module 380, data persistence module 385, and data validator module 365. Any or all of the components of application extender logic module 301 may be hardware based, such that each is enabled by the hardware of system 300 in conjunction with the system 300's processor(s) 390 and memory 395 to carry out the described capabilities. In accordance with one embodiment, table creation module 370 provides a mechanism to create a user session when necessary unique to a client device sending a request to the host organization and further to generate a user session data table within the user session based on a table structure defined by metadata. Table population module 375 operates to retrieve and also populate data into the user session data table based on an input data mapping defined by metadata. UI Generator module 380 operates to incorporate controls into a renderable UI based on metadata and also data elements necessary in support of the controls based on the metadata, where the data elements are incorporated from the user session data table. Data persistence module 385 operates to implement data persistence into a communicably interfaced database (such as a multi-tenant database system or regular database) based on a mapping defined within the metadata (e.g., providing synchronization between a data element or cell stored within memory 395 and a location within a database system). Data validator module 365 operates to validate update data received (e.g., via a second request responsive to a transmitted renderable UI). Validation may include verifying that update data corresponds to an updateable field or cell within the user session data table, or verifying that update data complies with a validation mask corresponding to the target location for the update data.

In one embodiment, a system 300 is to operate within a host organization, in which the system 300 includes: a processor to execute instructions; a request interface 325 to receive a request at the host organization from a client device, in which the request specifies the application (e.g., specifies application 335); a memory 395 to store a user session unique to the client device on behalf of the client device; a table creation program extension module 370 of an application extender 301 to generate a user session data table within the user session of the memory 395 based on metadata associated with the application 335 specified by the request, in which the metadata specifies a generic set of columns or data fields for use with the application 335 specified by the request; a table population program extension module 375 of the application extender 301 to populate data into the user session data table based on the metadata associated with the application 335 specified by the request; and a User Interface (UI) rendering program extension module 380 of the application extender 301 to generate a renderable User Interface (UI) based on the metadata associated with the application specified by the request and based further on the data in the user session data table. In such an embodiment, the application extender 301 of the system is to process the request via the application 335 specified by the request on behalf of the client device and to further cause the table population program extension module 375 to update the user session data table based on output received from the application 335.

In one embodiment, such a system 300 further includes a web server 325, in which the web server implements the request interface to receive request at the host organization in which the system 300 operates from a client device and in which the web-server 325 is to further transmit the renderable UI to the client device for display, responsive to the request having been received at the request interface of the web-server 325.

In one embodiment, the system 300 further includes a data persistence module 385 or program extension module which is to synchronize data within one or more cells of the user session data table with a corresponding one or more data persistence locations in a database. In such an embodiment, the data persistence module 385 or program extension module is further to synchronize updated data within the one or more cells in the user session data table with the corresponding one or more data persistence locations when the one or more cells in the user session data table are updated responsive to update data received within a second request received from the client device.

FIG. 4 is a flow diagram illustrating a method 400 for implementing a session table framework in an on-demand service environment in accordance with disclosed embodiments, including receiving requests, and retrieving or deriving metadata, generating a user session and a user session data table to maintain state information between user interactions, and transmitting a renderable UI responsive to receiving a request. Method 400 may be performed by processing logic that may include hardware (e.g., circuitry, dedicated logic, programmable logic, microcode, etc.), software (e.g., instructions run on a processing device to perform various operations such receiving, generating, populating, storing, persisting, and transmitting information and data in pursuance of fulfilling a request on behalf of a client device, or some combination thereof. In one embodiment, method 400 is performed by a hardware based system, such as system 300 set forth at FIG. 3. Some operations may be performed by an application extender agent or by application extender logic module 301 as set forth within system 300 of FIG. 3. Some of the blocks and/or operations listed below are optional in accordance with certain embodiments.

The numbering of the blocks presented is for the sake of clarity and is not intended to prescribe an order of operations in which the various blocks must occur.

Method 400 begins with processing logic for receiving a request at the host organization from a client device (block 405).

At block 410, processing logic retrieves, solicits, derives, or probes for metadata.

At block 415, processing logic generates a user session unique to the client device in a memory of the host organization and at block 420, processing logic creates a user session data table within the user session of the memory.

At block 425, processing logic populates data into the user session data table based on metadata associated with the application specified by the request.

At block 430, processing logic processes the request via the application specified by the request on behalf of the client device. For example, an application extender submits the request or a modified intermediate request to a hosted application for processing.

At block 435, processing logic updates the user session data table based on the processing of the request.

At block 440, processing logic generates and transmits a renderable User Interface (UI) based on the updated user session data table to the client device for display.

At block 445, processing logic receives a second request from the client device responsive to the response transmitted to the client device and at block 450, processing logic validates the update data against one or more cells within the user session data table which are updateable by the client device and updating the user session data table based on the validation. For example, validation may include verification that update data corresponds to a cell in the user session data table which is designated as updateable by the client device, verification that the update data is written into a designated UI entry field, or verification that update data complies with a data validation mask.

At block 455, processing logic processes the second request via the application using the update data in the user session data table.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and a persistent database and/or a multi-tenant database implementation), which communicate with each other via a bus 530. Main memory 504 includes a hosted application 524 which performs processing at the request of an application extender logic module 534 and indirectly at the request of a client device. Main memory 504 further includes a persistence module 523 which implements synchronization and data persistence operations between data elements within a memory 504 of the computer system 500 and a communicatively interfaced database, based on mapping defined by metadata. Main memory 504 and its sub-elements (e.g. 523 and 524) are operable in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.). The computer system 500 may further include an application extender agent or the application extender logic module 534 to perform operations including retrieving metadata, and facilitating the processing of requests submitted by client devices specifying the hosted application 524, in accordance with the described embodiments.

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method in a host organization, the method comprising:
   receiving a request at the host organization from a client device, the request specifying an application available via the host organization;
   generating, via an application extender, a user session unique to the client device in a memory of the host organization;
   creating, via the application extender, a user session data table within the user session of the memory;
   processing the request via the application specified by the request on behalf of the client device;
   populating data into the user session data table based on metadata associated with the application specified by the request, wherein the metadata specifies a generic set of columns or data fields for use with the application specified by the request and further wherein the metadata specifies a subset of the generic set of columns or data fields to be used for handling the request;
   updating the user session data table based on the processing of the request;
   transmitting a response to the client device responsive to the request; and
   wherein populating the data into the user session data table based on the metadata associated with the application comprises one of: (i) retrieving the metadata from a repository separate from the application specified by the request, the repository having previously stored the metadata for later retrieval, (ii) soliciting the metadata from the application by referencing an Application Programming Interface (API) of the application to request the metadata, (iii) deriving the metadata from the received request by systematically parsing one or more of a plurality of quantifiable data elements, data fields, columns, and name=value pairs from the received request, and (iv) probing the application specified by the request to yield application information to parse for one or more of the quantifiable data elements, the data fields, the columns, and the name=value pairs from output from the application responsive to the probe.

2. The method of claim 1, wherein transmitting the response to the client device responsive to the request comprises:
   generating a renderable User Interface (UI) based on the updated user session data table; and
   transmitting the renderable UI to the client device for display, responsive to receiving the request.

3. The method of claim 1, wherein the application specified by the request comprises a legacy application executing within the host organization, the legacy application having source code which is unavailable for modification or unsupported for modification.

4. The method of claim 1, wherein the application specified by the request comprises a third party application for which source code is proprietary and unavailable for modification or for which the source code is restricted from modification due to licensing terms for the application.

5. The method of claim 1, wherein the application specified by the request comprises a stateless application which maintains no state specific information regarding the client device between a plurality of interactions between the application and the client device; and
   wherein the user session data table within the user session of the memory stores data uniquely associated with the client device between the plurality of interactions with the client device on behalf of the stateless application.

6. The method of claim 1:
   wherein the application supports a first data set on behalf of the client device, and wherein the application extender implements support for a second data set on behalf of the client device, different than and complementary to the first data set; and
   wherein the application lacks support for the second data set.

7. The method of claim 1:
   wherein the application comprises a proprietary black box application supporting an enumerated set of inputs and yielding an enumerated set of outputs responsive to the enumerated set of inputs;
   wherein the implementing logic of the proprietary black box application to yield the enumerated set of outputs is not available for modification; and
   wherein the method further comprises the application extender applying further processing to the enumerated set of outputs yielded from the proprietary black box application.

8. The method of claim 1:
   wherein creating the user session data table comprises creating the user session data table based on metadata associated with the application specified by the request; and
   wherein the metadata defines a structure for the user session data table based upon which the user session data table is created.

9. The method of claim 1, further comprising:
   generating an intermediate request based on the received request, wherein generating the intermediate request includes transforming input presented to the application into a state or format which is compatible with the application, wherein the originally received request fails to format the request appropriately;
   capturing output from the application responsive to the intermediate request submitted to the application; and
   wherein transmitting the response to the client device responsive to the request comprises transmitting the response based on the captured output.

10. The method of claim 1, further comprising:
    receiving a second request from the client device specifying the application;
    wherein the second request is incomplete and incapable of processing by the application specified;
    supplementing the second request via the application extender based on previously captured data stored in the user session data table; and
    submitting the supplemented second request to the application for processing.

11. The method of claim 1, further comprising:
generating an intermediate request based on the received request, wherein generating the intermediate request includes transforming input presented to the application into a state or format which is compatible with the application, wherein the originally received request fails to format the request appropriately;
wherein processing the request further comprises submitting the intermediate request to the application specified.

12. A non-transitory computer readable storage medium having instructions stored thereon that, when executed by a system in a host organization having a processor and memory therein, the instructions cause the system to perform operations comprising:
receiving a request at the host organization from a client device, the request specifying an application available via the host organization;
generating, via an application extender, a user session unique to the client device in a memory of the host organization;
creating, via the application extender, a user session data table within the user session of the memory;
processing the request via the application specified by the request on behalf of the client device;
populating data into the user session data table based on metadata associated with the application specified by the request, wherein the metadata specifies a generic set of columns or data fields for use with the application specified by the request and further wherein the metadata specifies a subset of the generic set of columns or data fields to be used for handling the request;
updating the user session data table based on the processing of the request;
transmitting a response to the client device responsive to the request; and
wherein populating the data into the user session data table based on the metadata associated with the application comprises one of: (i) retrieving the metadata from a repository separate from the application specified by the request, the repository having previously stored the metadata for later retrieval, (ii) soliciting the metadata from the application by referencing an Application Programming Interface (API) of the application to request the metadata, (iii) deriving the metadata from the received request by systematically parsing one or more of a plurality of quantifiable data elements, data fields, columns, and name=value pairs from the received request, and (iv) probing the application specified by the request to yield application information to parse for one or more of the quantifiable data elements, the data fields, the columns, and the name=value pairs from output from the application responsive to the probe.

13. The non-transitory computer readable storage medium of claim 12, wherein transmitting the response to the client device responsive to the request comprises:
generating a renderable User Interface (UI) based on the updated user session data table; and
transmitting the renderable UI to the client device for display, responsive to receiving the request.

14. The non-transitory computer readable storage medium of claim 12, wherein the application specified by the request comprises a legacy application executing within the host organization, the legacy application having source code which is unavailable for modification or unsupported for modification.

15. The non-transitory computer readable storage medium of claim 12, wherein the application specified by the request comprises a third party application for which source code is proprietary and unavailable for modification or for which the source code is restricted from modification due to licensing terms for the application; or alternatively
wherein the application comprises a proprietary black box application supporting an enumerated set of inputs and yielding an enumerated set of outputs responsive to the enumerated set of inputs;
wherein the implementing logic of the proprietary black box application to yield the enumerated set of outputs is not available for modification; and
wherein the method further comprises the application extender applying further processing to the enumerated set of outputs yielded from the proprietary black box application.

16. The non-transitory computer readable storage medium of claim 12, wherein the application specified by the request comprises a stateless application which maintains no state specific information regarding the client device between a plurality of interactions between the application and the client device; and
wherein the user session data table within the user session of the memory stores data uniquely associated with the client device between the plurality of interactions with the client device on behalf of the stateless application.

17. The non-transitory computer readable storage medium of claim 12, wherein processing the request via the application further comprises:
generating an intermediate request based on the received request, wherein generating the intermediate request includes transforming input presented to the application into a state or format which is compatible with the application, wherein the originally received request fails to format the request appropriately; and
submitting the intermediate request to the application specified.

18. A system comprising:
a processor to execute instructions;
a request interface to receive a request at the host organization from a client device, the request specifying an application available via the host organization;
an application extender to generate a user session unique to the client device in a memory of the host organization;
the application extender to further create a user session data table within the user session of the memory;
the application extender to further process the request via the application specified by the request on behalf of the client device;
the application extender to further populate data into the user session data table based on metadata associated with the application specified by the request, wherein the metadata specifies a generic set of columns or data fields for use with the application specified by the request and further wherein the metadata specifies a subset of the generic set of columns or data fields to be used for handling the request;
wherein the application extender to populate the data into the user session data table based on the metadata associated with the application comprises one of: (i) the application extender retrieving the metadata from a repository separate from the application specified by the request, the repository having previously stored the metadata for later retrieval, (ii) the application extender soliciting the metadata from the application by referencing an Application Programming Interface (API) of the application to request the metadata, (iii) the application extender deriving the metadata from the received request by systematically parsing one or more of a plurality of quantifiable data elements, data fields, columns, and name=value pairs from the received request, and (iv) the application extender probing the application specified by the request to yield application information to parse for one or more of the quantifiable data elements, the data fields, the columns, and the name=value pairs from output from the application responsive to the probe;

the application extender to further update the user session data table based on the processing of the request; and wherein the system is to further transmit a response to the client device responsive to the request.

19. The system of claim 18, wherein the application specified by the request comprises a legacy application executing within the host organization, the legacy application having source code which is unavailable for modification or unsupported for modification.

20. The system of claim 18, wherein the application specified by the request comprises a stateless application which maintains no state specific information regarding the client device between a plurality of interactions between the application and the client device; and wherein the user session data table within the user session of the memory stores data uniquely associated with the client device between the plurality of interactions with the client device on behalf of the stateless application.

* * * * *